Dec. 9, 1941.  K. D. McFARLANE  2,265,536
HEATED BOXCAR
Filed Oct. 12, 1938  2 Sheets-Sheet 1

INVENTOR
KENNETH D. MC FARLANE
BY Orton and Griswold.
ATTORNEYS

Dec. 9, 1941.    K. D. McFARLANE    2,265,536
HEATED BOXCAR
Filed Oct. 12, 1938    2 Sheets-Sheet 2
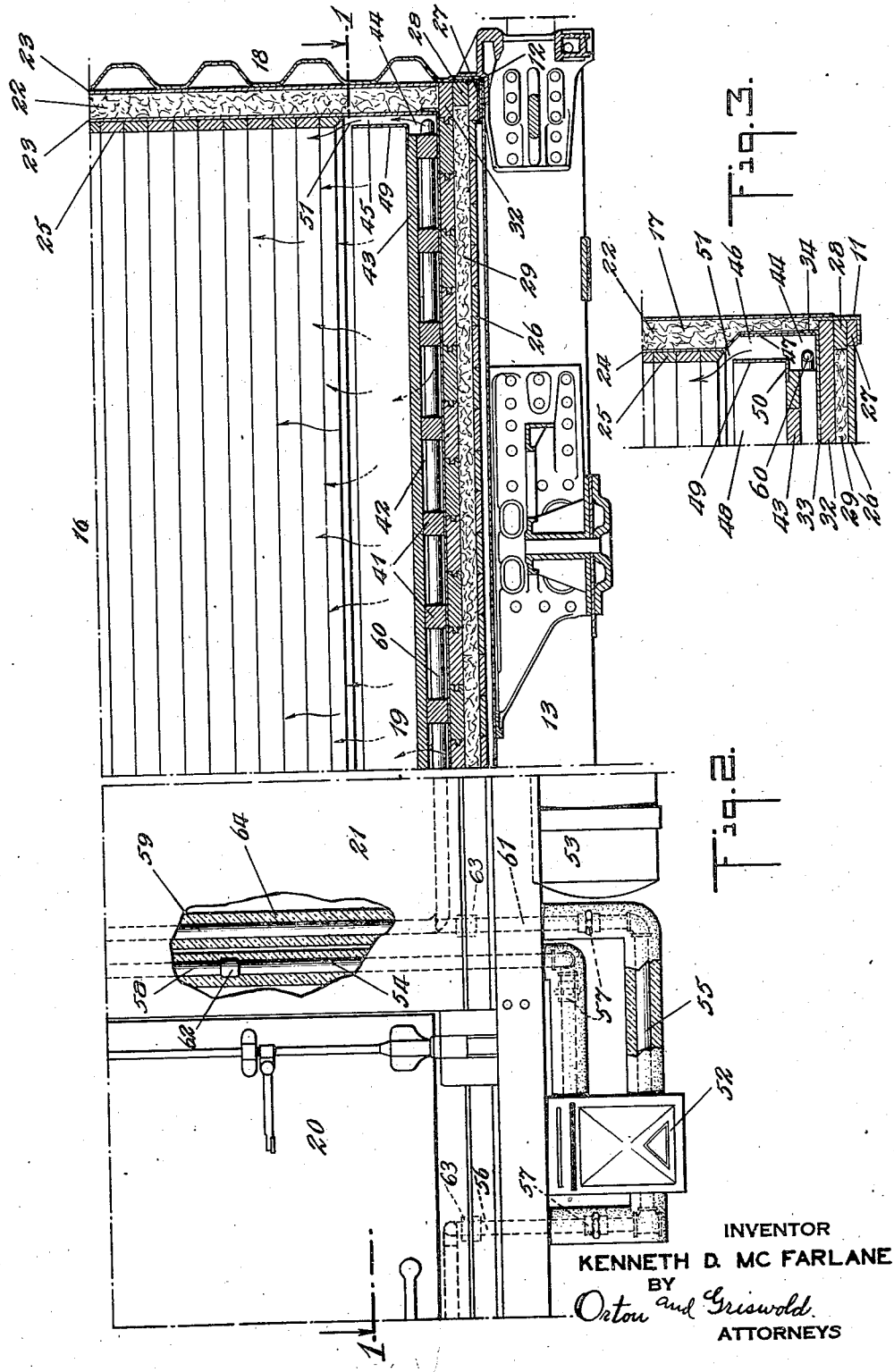
INVENTOR
KENNETH D. MC FARLANE
BY
Orton and Griswold.
ATTORNEYS Patented Dec. 9, 1941

2,265,536

UNITED STATES PATENT OFFICE 2,265,536

HEATED BOXCAR

Kenneth D. McFarlane, Passaic, N. J., assignor to Magor Car Corporation, Passaic, N. J., a corporation of Delaware Application October 12, 1938, Serial No. 234,572

19 Claims. (Cl. 237—43)

The invention relates to a heater freight car of the box type in which the floor, walls and roof are insulated and which car is provided with a permanently installed heating system. The disclosure is particularly directed to a box freight car where every effort is made to obtain the maximum storage space within the over-all dimensions of the car and is not to be confused with a refrigerator car which usually contains within its interior space either refrigerating apparatus as ice bunkers and which form of cars do not need and do not possess the insulation necessary for a heater car of the type herein featured.

The primary object of the invention is to provide a simplified form of heater car of the type outlined, the interior storage space of which is free of obstructions between its outlining walls and thus possesses maximum volumetric capacity and which space can be kept heated at substantially the same temperature in all parts thereof; at the same time to provide such an organization of structural parts so as to minimize in external heat losses. The invention also features the providing of such an arrangement of the structural car parts, particularly in the arrangement of its insulating features and in its distribution and apportioning of heat, as will provide for an economic operation of the heating system.

It has been known heretofore in this art to provide freight cars with a hot air heating plant and to circulate the hot air therefrom through the walls and floors of such freight cars. This practice has not proven entirely satisfactory, among other reasons because the freely circulating air must travel long distances from the source of heat before it contacts with remote parts to be heated and as air has small heat carrying capacity it has been practically impossible to heat remote portions such as the outlining bottom edges of the car interior despite the practice of following refrigerator car construction in attempts to insulate the walls, floor and roof against these heat losses. While it is desirable to circulate warm air about the fruit, vegetables or other products usually transported in heater cars, it is of advantage to have such air traverse relatively short paths in the open interior of the car before it is again reheated. The present practice with its necessarily long air flues and conduits causes too great a temperature drop in the different parts of the air conduit and thus in the different parts of the car interior before the air is reheated.

Accordingly, another object of the invention is to provide in a freight car which does possess flues and air conduits for distributing air about the lading in the car, an arrangement of such flues and the heating of the same without necessity of the air flowing back to the original source of heat.

Broadly, this is attained by installing within the several air flues or conduits a hot water or hot solution system which can be heated from a central source to any desired temperature sufficient to maintain the interior of the car at the desired temperature and which system will have carrying capacity to carry heat with minimum loss in transit to each of the separate air conduits or flues so that in effect each conduit or flue will have its own source of heat and in this way avoid necessity of the air travelling to and from the basic source of heat.

Still featuring economy in operating costs, the invention has for another object the proportioning of the high temperature heat conducting liquid per unit of length and arranging unit length so as first to heat the floor by direct radiation and, second, to heat the air within and adjacent the floor in such balanced relation so that the car lading will be at substantially the same temperature throughout its bulk irrespective as to whether it is heated through its bottom portion by contact with the floor, or heated in and about its upper portion by contact with the circulating warm air.

Broadly, this aspect of the invention is attained by disposing the hot water or other liquid containing pipes for the most part beneath the floor so as to heat the floor by direct heat radiation and by disposing other pipes containing the hot liquid in those portions of the car which are most likely to become cold while in use and in locating such pipes in wells or covers which open upwardly into the interior of the car and disposed to supplement the usual wall insulation by a blanket of warm air along that portion of the wall which is most likely to be effected by heat losses.

Still another object of the invention is to provide a form of cover and air conducting and heating well which will be formed, at least in part, of readily replaceable sides so as to permit ready access to the cove and wells for cleaning the same and which at the same time will provide steel or other metal cove sides or walls at the bottom of the usual insulated walls and which being of heat conducting material will tend to transfer heat therethrough to heat the air at the bottom of the car interior.

Various other objects and advantages of the invention will be in part obvious from an inspection of the accompanying drawings and in part will be more fully set forth in the following particular description of one form of car embodying the invention, and the invention also consists in certain new and novel features of construction and combination of parts hereinafter set forth and claimed.

In the accompanying drawings:

Fig. 2 is a view partly in side elevation and partly a vertical sectional view of a portion of the car shown in Fig. 1 and taken in the longitudinal medial plane and both Figs. 1 and 2 showing intermediate portions of the car broken away; and Fig. 3 is a detail in vertical section of a slightly modified form of the lower portion of the car side and adjacent floor structure.

Figure 1:
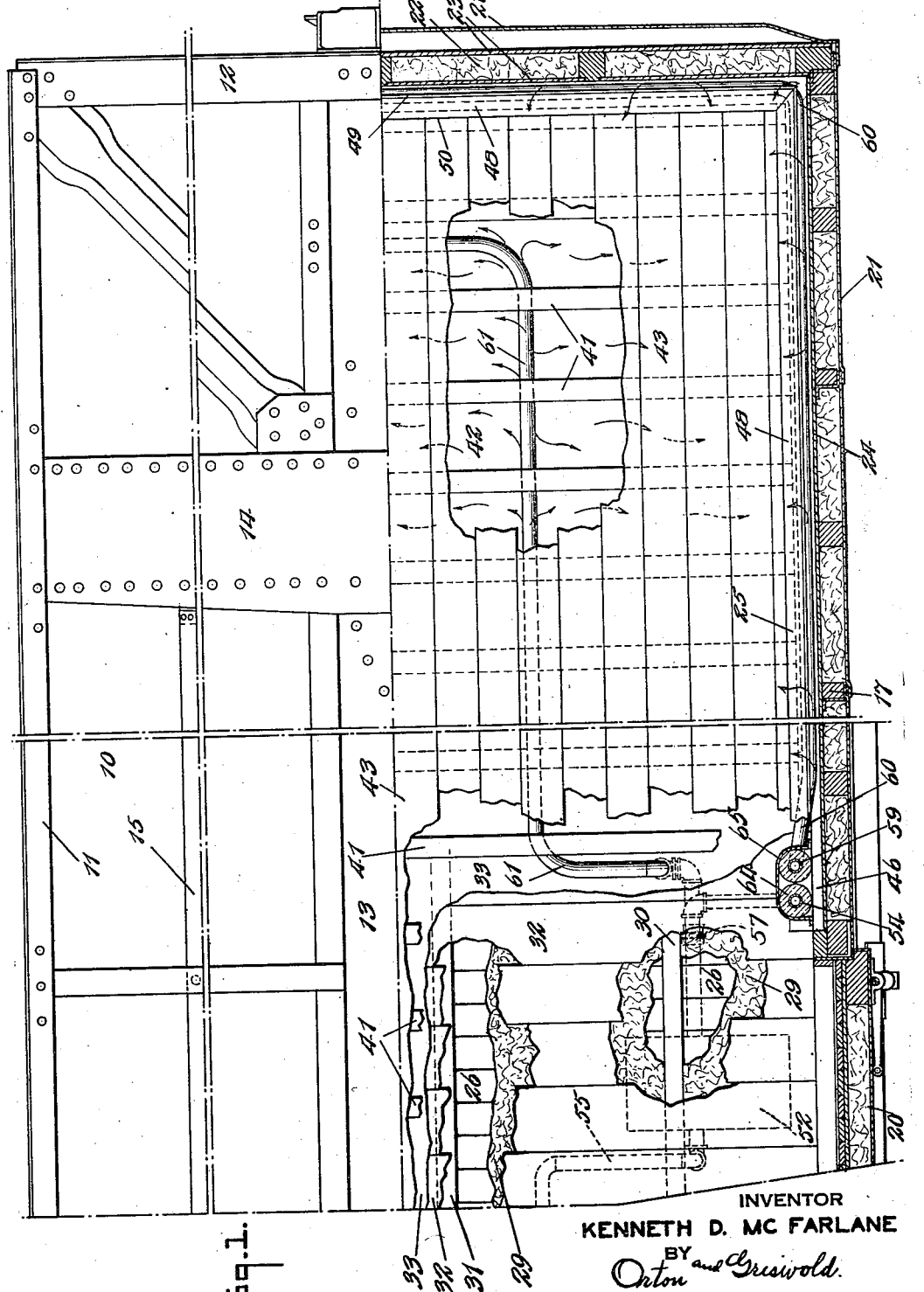
Fig. 1 is a plan view of one end of a car constituting a preferred embodiment of the invention shown in part on the lines 1—1 of Fig. 2 looking downwardly as indicated by the arrows and with successive parts of the floor structure broken away to show structure beneath the wearing floor.

The car herein illustrated is somewhat of conventional design and includes a metallic car body underframe 10 comprising side sills 11, end sills 12, a center sill 13, bolsters 14 and stringers 15. Positioned on this metal underframe is a box car body 16 including four car sides, that is, side walls 17 and end walls 18, a roof (not shown), floor construction 19, side door 20, and otherwise the intent is to illustrate the invention in connection with any standard form of insulated freight car. The car sides are formed of an outer steel sheet 21 corrugated in the case of the end walls, blanket wall insulation 22, paper insulation 23 or board insulation 24 on opposite sides of the blanket insulation or, at least, on the inner side and inner wooden tongue and groove lining 25. In this way there is formed a storage space of maximum capacity outlined from floor to roof with smooth wooden lining free of projections of any kind.

Referring to the floor construction, there are disclosed three superposed and spaced apart floors supported from the metal underframe and particularly from the side and end sills as shown in Figs. 2 and 3. These floors are all solid between their outlining edges and thus defeat any tendency to provide air leakage therethrough. There is disclosed a wooden bottom floor 26, the end board being of slightly greater thickness than the other floor boarding and forming a filler block 27 positioned directly on the end sill as shown in Fig. 2. Positioned on top of the filler block 27 is a spacing block 28 to define the depth of the layer of floor insulation 29. It is suggested that similar long spacing blocks be located on top of the bottom floor and over other metal parts of the underframe and as shown a spacing block 30 is located over each stringer 15 and a pair of spacing blocks 31 are located over the center sill. These longitudinal blocks divide the insulating layer 29 into five long strips extending from end to end of the car.

Positioned on top of these spacing blocks 28, 30 and 31 is the usual load carrying floor 32. This floor is of more rugged construction than the other floors as it is particularly designed to carry the weight of the lading in the interior of the car and is disposed to transmit this weight through rugged parts to the steel underframe. It is particularly noted that the boards forming this floor 32 extend transversely of the length of the car so that the span between the metal parts of the underframe supporting it are relatively short. This floor is intended to be a permanent part of the car and when once fabricated and installed in position is not ordinarily intended to be replaced. It is noted that the steel sheets forming the outer faces of the car sides 17 as shown in Fig. 3 and sheets forming the outer sides of the end walls 18 as shown in Fig. 2 are secured at their lower edges to the steel car underframe while the balance of the car sides are positioned on the outer edges of the load carrying floor.

Located on top of the floor 32 is a super floor construction comprising a plurality of parallel transversely extending and longitudinally spaced apart beams herein sometimes referred to as bearing spacers 41. It is noted as by reference to the showing in Figs. 1 and 2 that these spacers are arranged relatively close together; in one form of the invention being spaced twelve inches between centers so as to form therebetween a plurality of narrow air passageways 42 extending from side to side of the car. These passageways are regarded as being important because they divide the space beneath the wearing floor 43 into distinct and separate transverse air channels each of relatively small air containing capacity so that any obstruction to the passage of air therethrough or therefrom in so far as any one or more of the passageways are concerned will have no appreciable effect upon the freedom of air movement through and out of other air passages not so restricted or obstructed.

The wearing floor 43 is positioned on top of the spacers 41 and it is particularly noted that the boards forming the wearing floor extend longitudinally of the car. This arrangement of boards forming the wearing floor facilitates the trucking of heavy loads from place to place about the interior of the car.

The wearing floor terminates along its outlining four edges in spaced relation to the adjacent car walls to provide a well 44 about the four sides of the car. The bottom portion of the lining at the car end is cut away as shown in Fig. 2 to provide an upstanding end cove 45 and as by reference to Fig. 3 the lower portion of the inner lining as well as a portion of the insulations 23 and 22 is cut back from the inside face of the side walls to provide a side cove 46 extending from the end coves 45 to the adjacent frames of the side doors 20 and each opening at its end into the adjacent end cove. These end and side coves open downwardly each into their adjacent well 44 so that there is formed along each car wall and from one side door around to the others, a continuous cove or recess of relatively large air containing capacity, the lower portion of which recess is formed at least in part by the well.

The outer side of the side cove 46 as shown in Fig. 3 is faced with a steel lining plate 47 which acts to retain the insulation 22 in place and to prevent it from falling into either the cove or well.

It is a feature of this disclosure that the coves open at their upper portions into the interior of the car in spaced relation above the wearing floor 43. For this purpose the inner sides of all of the coves are defined by a steel cove plate 48. The cove plate 48 is a flanged plate extending the length of the associated car wall and comprises an upstanding web 49 forming in effect the downward continuation of the inner face of the car wall otherwise provided by the inner lining 25. The cove plate also includes a horizontally extending bottom flange 50 set into the adjacent edge of the wearing floor so as to form a flush mounting therewith. The cove plate as a whole is readily removable by loosening suitable fastening means (not shown) so as to provide ready access to the cove and well to permit the same to be cleansed of any material which may leak into the same. The upper edge of flange 49 is spaced a short distance below the cut back edge of the lining 25 to provide a long narrow air vent 51. While the illustrated showing discloses this air vent as a continuous opening, it is obviously within the scope of the disclosure to form the air vent as a plurality of slotted openings along each car side and this will be done especially in those cases where small material forming the lading would be apt to flow through the air vent and into the coves and wells. Instead of the spacers 41 resting directly on the main floor 32, it is suggested that a sheet paper lining 33 be laid on the main floor. The lining 33 has its edges upturned to form flanges 34 back-lapping the lower edge of the insulation 23 or 24.

Referring to the heater system, there is disclosed in the space beneath one of the doors 20 and thus accessible from one side of the car center a combined heater and boiler 52 supplied with fuel from a tank 53 both hung from the metal underframe. Suitable thermostats in the interior of the car control the burner automatically. The boiler is designed to heat water or a liquid compound having high thermal capacity which is conducted through a closed piping system about the car interior particularly beneath the wearing floor and hence back to the boiler for repeated reheating.

In heating plants of this character it is necessary occasionally to remove the boiler for repairs and replacements. However, it is a feature of the disclosure herein that while the boiler and immediate parts attached thereto may be removed at will, the piping system in the car must be retained permanently in place even though the wearing floor be replaced from time to time as it becomes necessary to replace a worn or damaged floor. Accordingly the present disclosure features in the piping system, readily accessible and easily operable means for separating the removable boiler from the permanently retained piping system.

In the drawings insulated supply pipe 54 leading from the boiler is considered a part removable with the boiler and leads upwardly through the floor structure and into the interior of the car a short distance above the wearing floor. Also forming part of the boiler is one or more return pipes 55 and 56, each including a union 57 providing a convenient means outside of the car for breaking the connection between the boiler and the piping system within the car.

The piping beyond the removable pipe 59 and up to the unions 57 is welded or otherwise fabricated to form a one-piece, permanent structure to avoid possibility of leakage at any joint. The piping 58 beyond the coupling 62 includes an upstanding supply pipe 58 which leads upwardly to a T (not shown) and is intended to be removable. One branch leads from the T across the top of the adjacent door 20 and then downwardly beyond the door to form a heating system for the left end of the car similar to the system herein illustrated for the right end and terminating in the pipe 56. The portion which extends over the door is likewise intended to be removable. From the T a down supply pipe 59 leads to a horizontally disposed pipe 60 which extends into and along the adjacent side well 44 then turns into and along the end well 46, hence into and along the opposite side well for about one-half a car length thus supplying high temperatured heat direct from the boiler to the outer edges of the car end and the two adjacent car sides up to the side doors.

The pipe 60 then turns inwardly from the side of the car forming the upper side of Fig. 1, towards the center sill passes toward the right and forms a U, the lower end half portion of which is shown in dotted and full lines in Fig. 1 at 61. From the end of this U the pipe is turned down as shown in Fig. 2, extends through the car floor and connects with the return pipe 55 through the right hand union 57. This U-portion of the pipe extends through the transverse spacers 41 which act to keep the pipe centered between the floors 32 and 43. The length of pipes in the passageways 42 is short but sufficient to heat the air in these passageways to a temperature sufficient to cause the slow air flow horizontally into the wells where it will meet the higher heating effect of the supply pipe therein. The return pipes are close to the underside of the relatively thin wearing floor so that the floor and thus the underside of the lading on the floor are heated directly by radiation of heat from these hot liquid containing pipes.

It is a feature of this disclosure that even without the unions 57 in the return lines, the boiler and associated parts of the supply and return lines be separable from the balance of the piping which is formed of a single length of pipe permanently installed and for the most part concealed beneath the wearing floor. For this purpose the up-flow supply pipes 54 and 58 include a coupling 62 and both of the down-flow return pipes 56 and 61 on opposite sides of the adjacent door 20 each include a coupling 63. These pipes 54 and 59 are contained in a box 65 which may extend from the floor to the roof, secured to the adjacent car side and readily opened to provide access to the couplings.

Cars of this character chill most rapidly at their ends and it is particularly noted that in this disclosure a length of the hot supply pipe extends along the end wells close to the insulated lower portion of the car ends.

In operation and assuming the boiler to be active, the hot water or other heat conveying liquid is conducted while at its maximum temperature to the length of pipe 60 which is in the wells at the feet of the several car walls so that the heat from the flowing liquid acts to heat the air at the bottom of the coves and thus cause the heated air to rise upwardly and discharge through the air vents 51 into the interior of the car and across the top of any lading in the car. It is believed that the heated air will become unbalanced due to unequal cooling on one side or the other and will then have a tendency to move lazily in more or less closed circuits transversely of the car, passing in one direction through the several passageways 42, upwardly through one cove, across the car interior and downwardly through the other cove back into the passageways. At the same time these edge pipes will directly heat the metal cove plate 48 and therethrough heat the outlining edges of the contained lading and thus supply maximum heat to the portion which is most likely to become cool.

Of course there will be a gradual cooling of the supply pipe as it approaches the return pipe 61 of the system but the activity of the boiler may be set thermostatically or otherwise so that the temperature of the liquid in the return pipe will be sufficient to contribute its proportion of heat to maintain the entire lading space at substantially the same temperature.

In general, the high temperatured heat is applied to the lower portion of the car interior and raises by natural air convection towards the upper portion. No blowers or fans are necessary to move the air as the change in temperature is usually sufficient to create the necessary slow draft. Suitable air vents may be applied to the upper portion of the car to permit a gradual leakage of hot air from the car and to permit fresh air into the car but in general it is the intent to make the car more or less hermetically sealed in order to economize in heat losses.

It is understood that the heating system is not primarily an air heating system in that the heating air is not in contact with the source of heat but a hot water or liquid heating system in which high temperatured water or other liquid having high thermal capacity is conducted to the several parts of the car and these heat the local air.

The wells simply contain the hot supply pipes and therefore receive the highest temperature and are not affected by the presence of any relatively cool return pipe for the relatively cool return pipes are located in the relatively warmer mid-portion of the floor and thus remote from the outlining parts which are more likely to become cool.

While there have been shown, described and pointed out in the annexed claims, certain novel features of the invention, it will me understood that various omissions, substitutions and changes in the form and details of the device illustrated and in its operation may be made by those skilled in the art without departing from the spirit of the invention.

I claim:

1. In a heater freight car, the combination of a metallic car frame including end and side sills, a body the entire interior of which forms a storage space, three solid wooden floors supported in superposed relation from said sills, the top floor forming the wearing floor and defining the bottom of the interior of the car, the bottom and intermediate floors being vertically spaced apart with a filling of insulating material therebetween, the top and intermediate floors being vertically spaced apart to provide an air conduit therebetween having openings at its opposite ends into the interior of the car above and adjacent the floor at opposite sides of the car and being otherwise closed, a heating system including a source of heat exteriorly of the car and a hot liquid containing pipe leading from the source beneath the wearing floor and then back to the source, a part of said pipe located in the air conduit for heating the air therein and for causing the air so heated in the air conduits to pass repeatedly through the conduit and across within the interior of the car and said hot pipes disposed close to the underside of the wearing floor to heat the wearing floor by direct radiation from the portions of the pipe beneath the floor.

2. A heater freight car of the box type having its interior lading receiving space substantially hermetically sealed and heat insulated, a wearing floor defining the bottom of said interior space, means providing a closed air circuit including air passageways located partly beneath the floor and partly extending upwardly therefrom for a short distance along each side of the car, said upwardly extending portions of the passageways opening at their upper ends into the interior of the car to discharge warm air into the same above the bottom of any lading in the car, and a heating system mounted on the car and having capacity to keep all parts of the interior of the car at substantially the same temperature, said system including a closed hot liquid circuit comprising a line of heating pipes contained for the most part in the air passageways to heat the air therein and thus cause the air so heated to circulate about the car interior and heat the contents thereof by heat convection, and certain of said pipes disposed immediately below the wearing floor and arranged to heat the same by direct radiation of heat from these heating pipes.

3. A heater freight car having its entire interior forming a lading receiving space insulated to minimize heat and air leakage, a floor construction adapted to be supported from the metal underframe of the car and comprising three superposed and spaced apart floors, solid between their outlining edges and including a bottom floor, a layer of insulation thereon, a load carrying floor, bearing spacers thereon and a wear floor carried by the spacer, extending from end to end of the car and defining the bottom of said receiving space, the spacers being spaced apart to provide air passageways, means both for creating a closed path of air circulation extending through the air passageways and in the space above the wearing floor and intercommunicating solely at the opposite sides and ends of the car, and a heating system for the car including pipes forming a closed path of heated liquid, certain of said pipes being beneath the wearing floor and acting to heat the floor by direct heat radiation from said pipes and acting to heat the air in said closed path to cause the air as it circulates through said space to heat the contents thereof by hot air convection.

4. In a heater freight car, the combination of structural parts defining a lading receiving space coextensive with the entire interior space of the car, and said structural parts being insulated to minimize heat losses from said space, a wearing floor adapted to support the lading in said space, heater means tending to maintain all portions of said space at the same temperature, said means including a plurality of separate air passageways disposed for the most part beneath said wearing floor, a well in communication with all of said passageways and in turn opening into said space about all sides thereof, each passageway having a volumetric air capacity much less than the air capacity of the well, a closed heating circuit including a pipe having portions thereof located in each air passageway and in the well, the length of pipe in each passageway being relatively short compared to the length of pipe in the well and a single source of heat for heating the contents of said closed heating circuit.

5. In a freight car, the combination of a metal underframe including a center sill, a side sill and a stringer therebetween, a wooden bottom floor supported directly on the metal underframe, a plurality of spacing blocks, one each over the center sill, the stringer and the side sill, a rugged wooden load carrying floor resting on the spacing blocks and disposed to transmit lading weights thereon directly to the metal underframe through the spacing blocks, a filling of insulating material between the bottom floor and the load carrying floor, and between the spacing blocks, and a solid wooden wearing floor comprising contacting boards extending lengthwise of the car to form a smooth surface adapted to facilitate moving of loads along the same and supported directly on the load carrying floor and heating pipes between the load carrying floor and the wearing floor.

6. A heater freight car including insulated structural parts coacting to define an interior lading carrying space coextensive with the entire interior of the car and adapted to be hermetically sealed from the external air, said insulated structural parts including a flat wooden wearing floor extending between the outlining walls of the car and capable of transmitting heat therethrough to heat the bottom of the lading on the floor in said space, a heating system including a source of heat accessible from the outside of the car and a closed liquid heat conducting system built permanently into the car and heated from said source and including certain pipes located directly beneath said floor to heat the same and other pipes located beyond the outlining edges of the floor to supply heat to the car interior at the foot of the car walls.

7. In a freight car, the combination of a metallic car-body frame, a load carrying floor supported from the frame, an insulated car side positioned above the floor, a wearing floor supported above the load carrying floor and forming therebetween a plurality of air passageways, the inner face of the lower portion of the car side being recessed to provide a cove opening at its lower portion into the air passageways, and a readily removable cove plate defining the corner between the inner side face of a car wall and the wearing floor, outlining the inner face of the recessed cove and having its upper edge spaced from the recessed portion of the car side to provide an air vent for placing the cove in fluid communication with the interior of the car.

8. In a heater freight car, a floor construction including a rugged load carrying floor, a set of bearing spacers resting on the floor extending in parallel relation transversely of the length of the car to form a plurality of air passageways open solely at their ends into the interior of the car, a wearing floor positioned on top of the bearing spacers and closing the tops of said passageways and a heating system including heating pipes extending lengthwise of the car and transversely of the passageways to heat the air therein and also extending through the several bearing spacers and permanently mounted in place therein and spaced thereby from both of the floors.

9. In a heater freight car, the combination of an insulated floor construction including a flat continuous top wearing floor, and insulated upstanding car sides, said floor construction including a plurality of air chambers extending in parallel relation transversely beneath the wearing floor and between the opposing car sides said air chambers being each open to the interior of the car independently of each other along the bottom portion of each car side, means for creating a circulation of warm air transversely across the interior of the car, said means including a hot water heating system having pipes permanently contained in said air chambers to heat the air therein and to discharge the heated air into the interior of the car along each car side.

10. In a freight car having insulated side walls and an insulated car bottom including a load carrying floor and a wearing floor, means providing a plurality of air passageways immediately beneath the wearing floor, means forming an upstanding open top cove inset into the foot of one of said side walls, placing the adjacent ends of all of said passageways in fluid communication with the interior of the car and means in each air passageway for heating the air therein to cause it in turn to heat the underside of the wearing floor and to cause the heated air to pass out of the passageways and through the cove into the interior of the car.

11. In a freight car, the combination of a wearing floor, means beneath the floor and coacting therewith to form the space immediately beneath the floor into a plurality of parallel, transversely extending air passageways, means forming a cove at the opposite long sides of the car and into which said air passageways open, each cove provided above the floor with a vent communicating with the interior of the car and heating pipes in each of said passageway for heating the air therein so as to cause the air so heated to heat the underside of the wearing floor and to cause the air to circulate through the several air passageways, coves and vent and through the interior of the car.

12. In a freight car, the combination of a metallic body frame including side sills, a load carrying floor supported along opposite longitudinal edges from said side sills, a plurality of bearing spacers extending parallel to each other transversely of the car and resting on said load carrying floor, a wearing floor having a flat top surface and comprising boards extending lengthwise of the car and resting on said bearing spacers, said bearing spacers coacting to form between said floors a transverse air passageway between each adjacent pair of bearing spacers, means forming an air conduit between the interior of the car and opposite ends of each of said transverse passageway and heat pipes extending across each of said air passageways to heat the air therein and to cause the heated air to pass into the interior of the car.

13. In a heater freight car of the box type including a lading containing space adapted to be hermetically sealed from outside air and including a wearing floor and insulated car sides, means for creating a circulation of warm air uniformly throughout the entire length of the car interior, said means including at each half of the car, a well below the top level of the wearing floor and extending along an end wall and the adjacent portions of the two side walls, said wells opening into the interior of the car above the wearing floor so that air may be discharged into the car along at least a portion of the length of each car side and a heating system including heating pipes located in said wells and along each car wall and means below the wearing floor for heating the same and providing air passageways connecting the portions of the well extending along the opposing longitudinal car sides and closed between their ends.

14. In a heater freight car of the box type including a lading containing space adapted to be closed to the entrance of external air and outlined in part by wearing floor and insulated car sides, means for creating a closed circulation of warm air throughout the entire length of the car interior, said means including a well below the top level of the wearing floor at each side and at each end of the car and extending across the entire width of the car interior, said wells opening into the interior of the car above the wearing floor and a heating system including heating pipes located in said well and along each car side and means below the wearing floor providing air passageways connecting the portions of the well extending along the opposing longitudinal car sides and said heating system including other heating pipes extending transversely of each of said air passageways to heat the air therein and thus heat the underside of the wearing floor.

15. In a freight car, the combination of a load carrying floor, insulated car sides supported on the carrying floor and each provided with a side door, a wearing floor positioned above the carrying floor and having an edge spaced from the car side to form a long well extending along the lower edge of the car walls from one door to the other, means providing a long narrow air vent spaced above the wearing floor, for placing the well in communication with the interior of the car along its length, and said means being solid between the air vent and the wearing floor to avoid direct heating of the upper side of the floor, a single line of heating pipes extending lengthwise of said well to heat the air therein and to cause the air so heated to drift upwardly into the interior of the car along a line adjacent but spaced above the lower portion of the inner face of the side walls.

16. In a heater freight car, the combination of a load carrying floor, a pair of insulated car sides at opposite edges of said floor, a wearing floor spaced above the carrying floor and having its opposite edge spaced inwardly from the adjacent car side to form a well at opposite edges of the wearing floor and between the same and the adjacent car side and a hot water heating system permanently located in the car below the top level of the wearing floor and including a relative hot feed line located in both of said wells and thus located to bring maximum temperature heat into the interior of the car adjacent the outer sides of the car and the relatively cooler return line of said system located inwardly of the car in spaced relation to both of opposite car sides thereby to supply a relatively less temperature heat to the interior portion of the wearing floor.

17. A freight car body including a car side including a lining, a layer of insulation outwardly of the lining and an outer steel sheet outwardly of the insulation, the lower portion of the lining and the adjacent portion of the insulation being recessed to form a cove at the foot of the car side, a metallic plate lining the outer side of the cove and insulated from the outer sheet by said layer, a metallic cove plate outlining the inner side of the cove, the lower edge of the lining and the upper edge of the cove plate coacting to form a long narrow air vent for placing the cove in communication with the interior of the car.

18. In a freight car, the combination of an insulated car side provided with a cove in the lower part of its inner face, a floor having one edge terminating short of the cove to form a well beyond said edge opening upwardly into the cove and a readily removable metal angle cove plate having an upstanding web forming a solid wall plate defining the inner face of the cove and forming the lower part of the inner face of the car side, and a horizontal flange forming a floor plate defining the top of the well and merging into the floor, and said upstanding and horizontal flanges forming a closed corner between the car side and floor to prevent the lading from falling into the well.

19. In a heater car, the combination of an insulated main load sustaining floor, a sheet paper lining covering said floor and a super-floor construction comprising a plurality of parallel spacer beams extending transversely of the car and resting on said sheet paper lining, a wearing floor carried by said spacer beams, said spacer beams coacting with the paper lining and with the wearing floor to form air passageways open at their opposite ends and otherwise closed, and a heating pipe passed transversely through the spacer beams, centered thereby between said load sustaining and wearing floors and thus spaced thereby from both the paper lining and the wearing floor to permit air as it moves along the passageways to pass around the portions of the pipe located between the spacer beams.

KENNETH D. McFARLANE.